Fig. 4.

Jan. 25, 1966  L. T. SKEGGS  3,231,181
AUTOMATIC SEPARATORY FUNNEL

Filed April 20, 1961  6 Sheets-Sheet 6

INVENTOR.
LEONARD T. SKEGGS
BY
ATTORNEY

United States Patent Office 3,231,181
Patented Jan. 25, 1966

3,231,181
AUTOMATIC SEPARATORY FUNNEL
Leonard T. Skeggs, Cleveland, Ohio, assignor to Technicon Instruments Corporation, Chauncey, N.Y., a corporation of New York
Filed Apr. 20, 1961, Ser. No. 104,437
7 Claims. (Cl. 233—3)

This invention relates to apparatus for separating immiscible liquids of different specific gravities, respectively, from each other.

The primary object of the invention is to provide a centrifugally-operable separatory funnel whereby to enable liquids which are immiscible with each other to be rapidly separated from each other in stratified condition in the funnel as a result of the centrifugal operation and thereafter to be separately decanted from the funnel as soon as or very shortly after the centrifugal operation is completed.

Another object is the provision of a centrifuge comprising a vessel mounted for rotation about a vertical axis, for the centrifugal separation of the liquids, and provided with an upper inlet opening for the introduction of the liquids into the centrifuge, and with a bottom controllable outlet for the decantation of one or more of the liquids separately after the centrifugal operation is completed.

A further object is to provide for the automatic time control of the centrifugal operation.

Another object of the present invention in connection with one of its embodiments is the provision of apparatus for separating immiscible liquids of different specific gravities, respectively, from each other which include means for intermixing a mixture of said liquids in a funnel and thereafter centrifuging said intermixed liquids to separate them from each other in the funnel before decanting them from the funnel.

Another object is generally to provide a separatory funnel of improved design and construction which is especially well suited for the separation of immiscible liquids of different specific gravities, respectively.

The above and other objects, features and advantages of this invention will be understood from the following description of the invention considered in connection with the accompanying illustrative drawings of the invention.

In the drawings:

FIG. 8 is a wiring diagram illustrating the controls for the apparatus;

FIG. 9 is a side elevational view of an apparatus in accordance with another embodiment of the invention, partly in section and with portions omitted for purposes of illustration;

Referring now to the drawings in detail and particularly FIGS. 1 to 7, the apparatus 10 includes provision for removably mounting a separatory funnel 12 for rotational movement about a horizontal axis for intermixing immiscible liquids of different specific gravities, respectively, which are introduced into the vessel and thereafter rotating the vessel about its vertical axis for separating the intermixed liquids from each other by centrifugal force. A motor 14 is provided for spinning the separatory funnel about its vertical axis for the centrifuging operation and a motor-gear combination 16 is provided for tumbling the separatory funnel and the spinning motor together as a unit about the horizontal axes of the stub shafts 18 and 20 for the intermixing operation. These shafts extend from the housing 22 which contains the funnel 12 and motor 14, and shaft 18 is journaled in a bearing 24 which is mounted in a pedestal 26 which is secured to the base 28 of the apparatus by bolts 30. Shaft 20 is journaled in a bearing 32 which is mounted in a housing 34 which contains the motor-gear combination 16 and other parts of the apparatus and this housing is also mounted on the base 28 by bolts 36. It will be understood that both shafts 18 and 20 are fixed to parts of housing 22 so that the shafts rotate with the housing as a unit.

Figure 1:
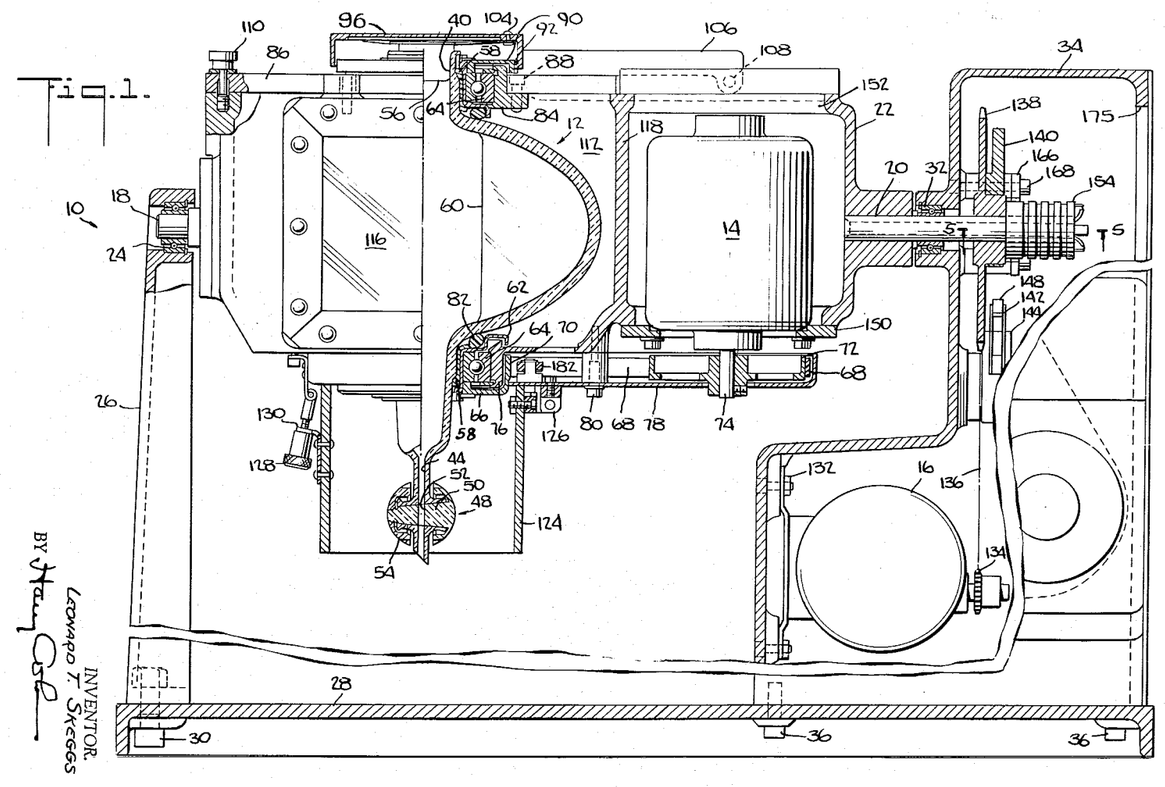
FIG. 1 is a side elevational view of the apparatus, partly in section and with portions omitted for purposes of illustration.
Figures 3, 4, 7:
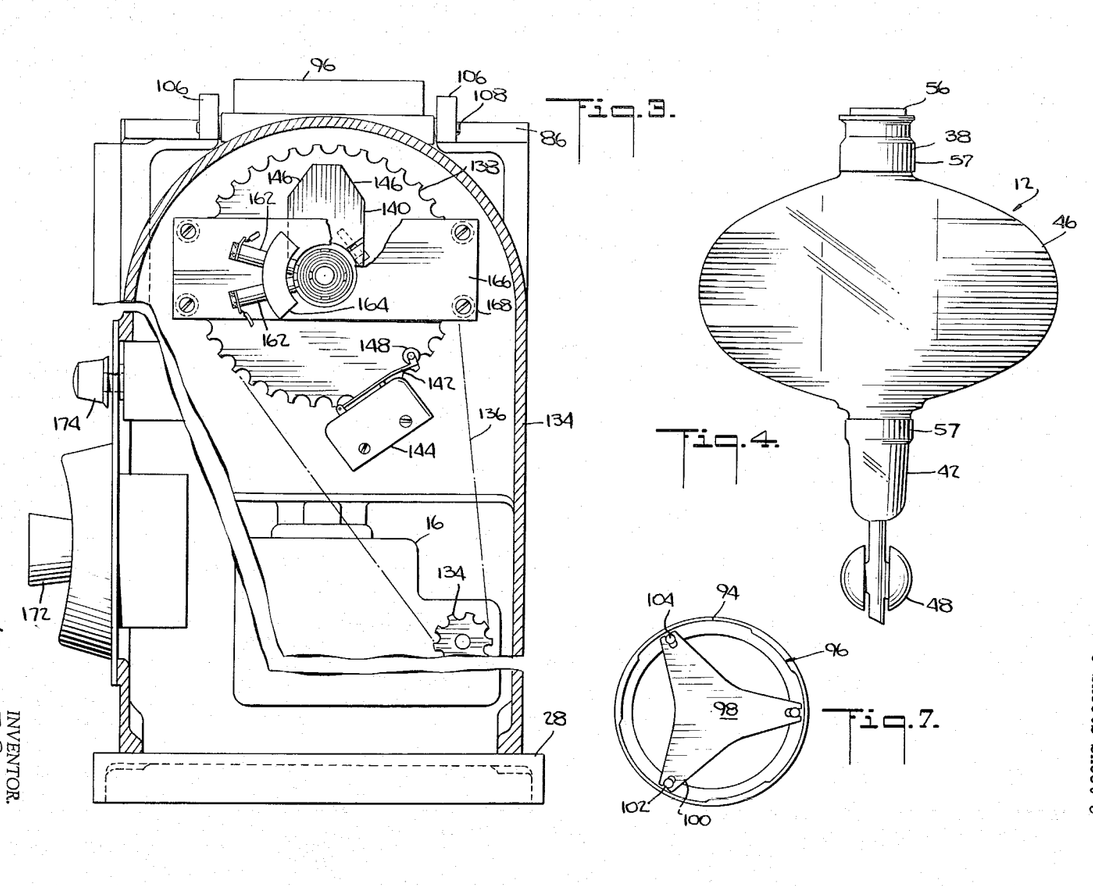
FIG. 3 is an end elevational view of the apparatus partly in section and with portions omitted for the purposes of illustration.
FIG. 4 is an elevational view of a separatory funnel in accordance with the invention.
FIG. 7 is a bottom plan view of a twist-off cover used in the apparatus.
Figure 4:
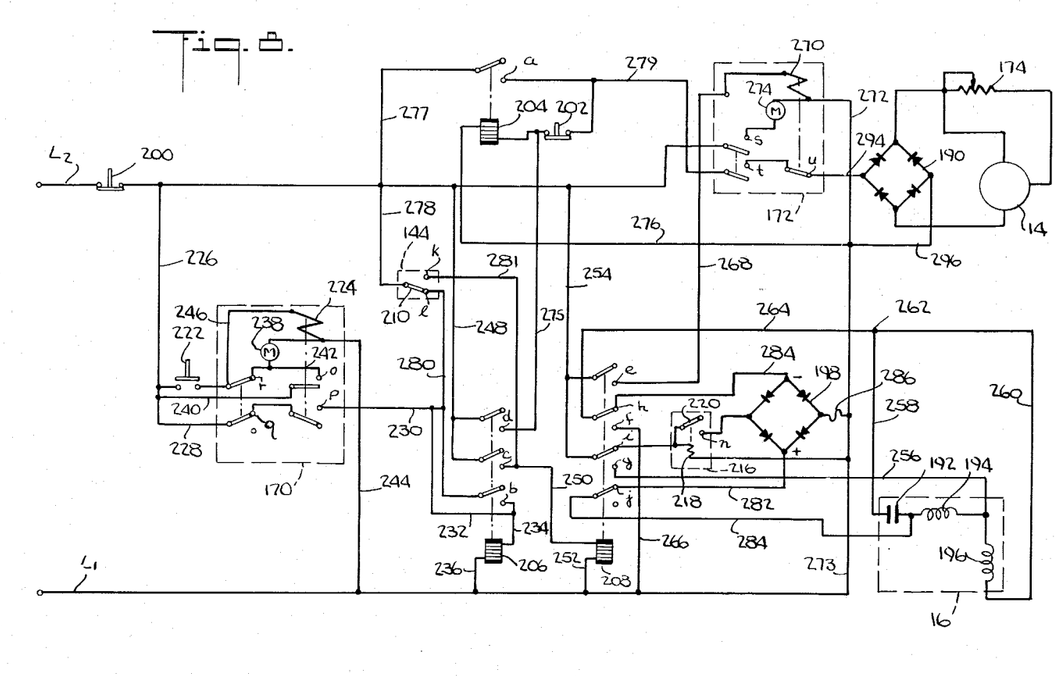
Figure 6:
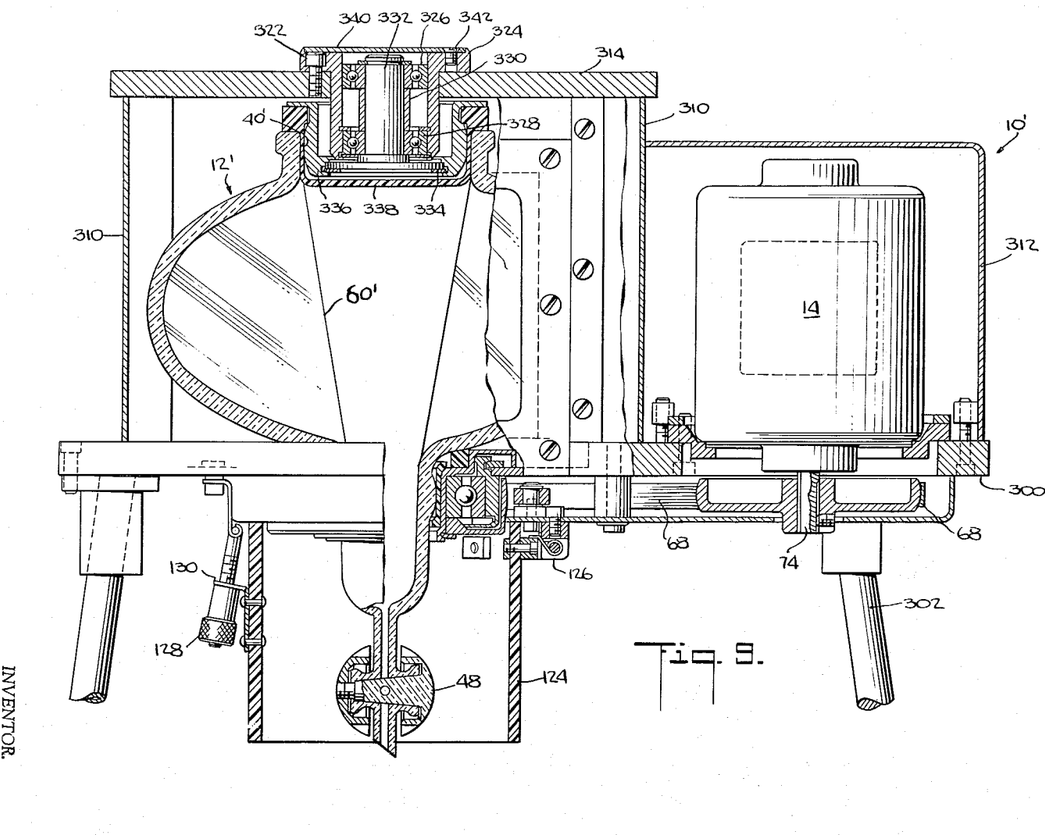

As best seen in FIGS. 1 and 4, the separatory funnel 12 is a hollow member preferably made of glass and comprises an upper inlet part 38 which has a liquid inlet opening 40, a lower outlet part 42 which tapers inwardly in a downward direction and has a liquid outlet opening 44 at its lower end, and an intermediate body portion 46 which has a configuration of oval-shaped transverse vertical sections and circular-shaped transverse horizontal sections. The flow of liquid from the funnel is controlled by a manually operated valve 48 which preferably includes a polytetrafluoroethylene plug 50 which has a passage 52 for the decanting liquids. The weight of the plug is balanced by the part 54 which is screwed to the smaller end of the plug and either part 54 or the plug may be grasped by the fingers for closing or opening the valve. The inlet opening of the funnel can be closed by the removable plug 56 and it will be understood that the inlet and outlet of the funnel are closed during the intermixing operation as well as during the centrifuging operation. A portion 57 of the outer surface of the inlet part and the outlet part of the funnel is cylindrical and a rubber or polytetrafluoroethylene ring 58 is forced onto said portions and provides a resilient cushion which the funnel mounting means of the apparatus frictionally engages for rotating the funnel. The body portion of the funnel may be provided with circumferentially spaced baffles 60 which divide the body portion into circumferentially arranged compartments which are in communication with each other at the central inner part of the body portion. The baffles prevent or lessen surging or turbulence of the liquid in various parts of the funnel.

The separatory funnel 12 is removably mounted in the apparatus and is held in position for rotational movement at the upper and lower rings 58. As best seen in FIG. 1, the lower rotatable support for the funnel comprises a rotary metal pan 62 which frictionally engages the ring 58 and which also engages the inner race of the bearing 64, at the upper side thereof, so that the inner race of the bearing, the pan 62 and the funnel rotate together as a unit about the vertical axis of the funnel because of their frictional engagement. The inner race is caused to rotate by a pulley 66 which engages the inner race of the bearing at the lower side thereof. Pulley 66 is caused to rotate by the belt 68 which engages the peripheral surface 70 of the pulley and the belt is driven by a pulley 72 which is connected to the shaft 74 of the motor 14. The outer race of the bearing is held fixed in position by part 76 of the frame 22. A cover plate 78 encloses the pulley drive and is secured to the frame 22 by the bolt 80. A resilient O-ring 82 provides a cushion between the lower part of the body portion of the funnel and the pan 62 and it will be understood that the O-ring rotates with the funnel.

The support for the upper part of the funnel is similar to what was just described with respect to the lower part of the funnel but no pulley drive is provided for this upper part. The outer race of the upper bearing 64 is prevented from rotating by a holder 84 which is secured to the removable cover 86 of the frame 22 by bolts 88. A ring-like member 90 is provided at the upper side of the upper bearing 64 and the inner peripheral edge of said member engages the inner race of the bearing while the outer peripheral edge of said member is provided with undercut portions 92 which provide slots for receiving the projecting portions 94 (see FIG. 7) of the twist-off cover 96 for locking said cover in place. The cover is provided with a spring-plate 98 whose undersurface engages the top surface of the plug 56 of the separatory funnel so that the cover is resiliently locked in position and holds the plug in the inlet opening of the funnel. The spring-plate is provided with arms 100 and each arm has a slot 102 into which the pins 104 from the cover 96 extend and it will be apparent that the spring-plate can move toward or away from the cover 96.

In order to mount a separatory funnel in the apparatus or to remove the funnel from the apparatus, the cover 86 can be pivoted upwardly from the position shown in FIG. 1 to permit the funnel to be vertically moved upwardly out of the apparatus or downwardly into the apparatus, as the case may be. For this purpose a pair of arms 106 is secured to the cover at one end of each arm and the opposite ends of the arms are pivoted to the frame 22, as at 108. Cover 86 is secured to the frame by bolts 110 which may be removed and the released cover pivoted into its open position to permit the mounting or removing of the funnel. It will be understood that with the opening movement of the cover, the upper support for the upper part of the funnel as well as the twist-off cap also move out of position since they are mounted on the cover.

The chamber 112 formed by the walls of the housing 22 in which the body portion 46 of the separatory funnel is disposed is provided with a front wall 114 which has a viewing window 116, preferably made of break-proof glass, and this viewing window enables the operator to observe the intermixing action and the centifuging action of the liquids in the funnel. The side wall 118, which separates chamber 112 from motor 14 is provided with an opening in which a light magnifying lens 120 is mounted. This lens increases the amount of light provided from light bulb 122 so that chamber 112 is well lighted to facilitate observation through the viewing window 116.

The lower part of the separatory funnel which extends below the lower support of the funnel, including the valve 48, is protected by a cylindrical guard 124 which encloses said parts of the funnel and is open at its lower end. The guard is preferably made of material sold under the trademark "Plexiglas" so that the lower parts of the funnel and the valve may be observed. The guard is pivoted to the cover 78 by the pivot connection 126. The guard may be pivoted downwardly out of the way, so that the lower parts of the separatory funnel are exposed, by unscrewing the locking screw 128, which is secured to cover 78, whereby the screw may be released from its engagement with the bifurcated lock member 130 which is secured to the guard. With the guard in its released position, access may be readily had to the plug 48 for opening the valve to decant the liquid from the funnel. Access to valve 48 may also be had without releasing guard 124 since there is ample space between the valve and the inner surface of the guard which enables the valve to be manipulated with the guard in place.

The previously mentioned motor-gear combination 16 for rotating the separatory funnel for the intermixing operation is secured to the wall of housing 34 by bolts 132 and operates a sprocket chain drive consisting of the driver sprocket wheel 134 which is secured to the output shaft of the motor-gear combination, a sprocket chain 136 which is indicated by the dot-dash line, and a driven sprocket wheel 138 which is secured to the shaft 20 that extends from the housing 22 into housing 34. An arm 140 is secured to the hub of the sprocket wheel 138 so that it rotates with said wheel and during each revolution actuates the operating arm 142 of a microswitch 144 which is secured to the wall of the housing. The corners of arm 140 are chamfered, as indicated by reference numeral 146, and the operating arm of the switch has a roller 148 which is engaged by the chamfered corners and the end of arm 140 to actuate the switch. As will be described more in detail hereinafter, the function of the microswitch and the rotating arm 140 is to control the intermixing operation so that at the end of the operation the separatory funnel is in a vertical position which is necessary for the centifuging operation.

Figures 2, 5, 6:
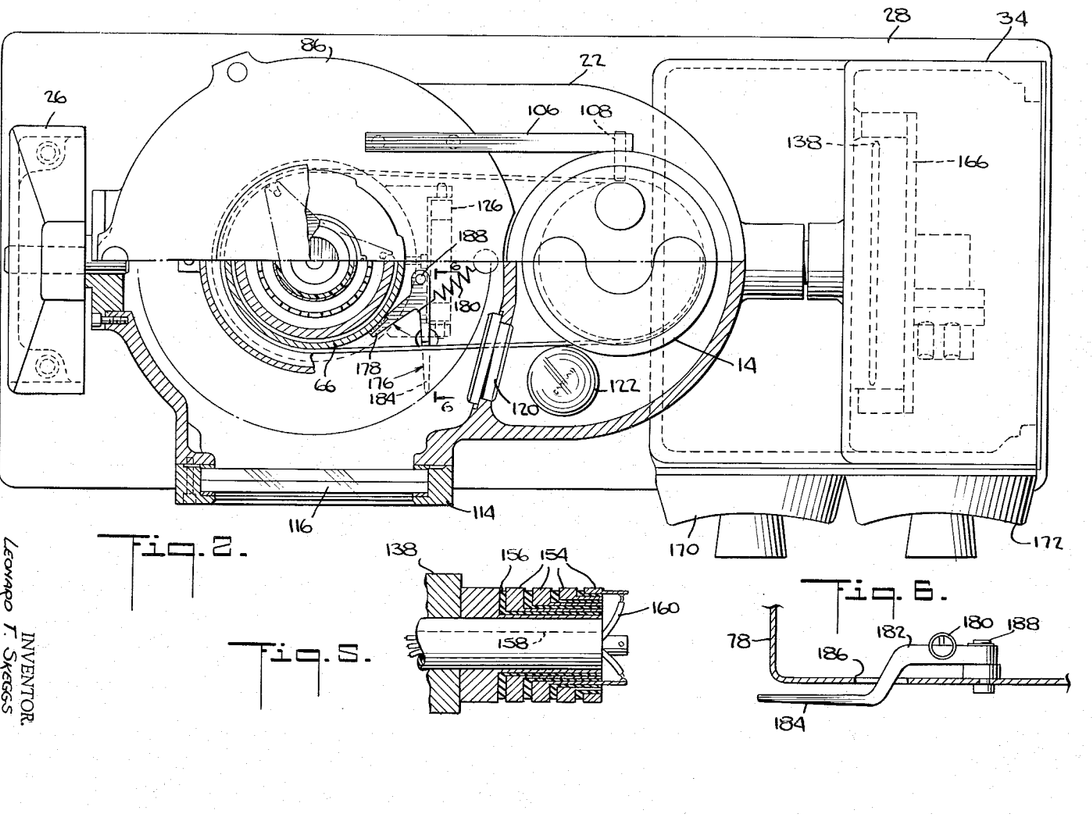
FIG. 2 is a top plan view, partly in section, of the apparatus.
FIG. 5 is a detail view, on a larger scale, taken on line 5—5 of FIG. 1.
FIG. 6 is a detail view, on a larger scale, taken on line 6—6 of FIG. 2.

Motor 14 for the centrifuging operation is mounted in housing 22 between a lower mounting plate 150 and an upper mounting plate 152 which are connected to the housing and since the motor rotates during the intermixing operation, it is necessary to provide slip rings 154 for transmission of electrical energy to the rotating motor and to the light bulb 122. Four slip rings are shown mounted on the end of shaft 20 and each ring is insulated from the other by insulation 156, as best seen in FIG. 5. One slip ring is a ground, one is for the field of the motor, one is for the armature of the motor, and one is to supply current to the lamp 122 and it will be understood that each slip ring is connected to its respective operating element by a lead wire which passes through the longitudinally extending passage 158 in shaft 20, as indicated for example by the wire 160 which supplies current to the lamp 122. The brushes for the slip rings are indicated at 162 (only two shown) and it will be understood that a brush is provided for each slip ring and the brushes are mounted laterally of each other in corresponding relation to the slip rings by the mounting block 164 which is secured to the mounting plate 166. Plate 166 is secured to the wall of the housing 34 by bolts 168.

The timer for controlling the period of intermixing of the liquids is indicated at 170 and the timer for controlling the period of centrifuging is indicated at 172. A rheostate 174 is also provided as a speed control for motor 14. The timers and the rheostate are mounted on housing 34 which is provided with an access opening 175.

A manually operated brake 176 is provided for facilitating the stopping of the centrifugal rotation of the separatory funnel since it will be understood that said funnel rotates at a relatively high speed, for example 3,000 r.p.m. As best seen in FIGS. 2 and 6, the brake comprises a Y-shaped part which has a contact member 178 which is biased into inoperative position by the tension spring 180. One end of the spring is secured to the contact member and the opposite end of the spring is secured to a part of the housing 22. An actuating arm 182 is integral with the contact member and has a grip portion 184 which passes downwardly through an opening 186 provided in the cover 78 so that the grip portion is readily accessible to the operator. Arm 182 and contact member 178 are pivoted at 188. In order to stop the centrifugal rotation of the separatory funnel after motor 14 is shut off, arm 182 is moved in a clockwise direction, as viewed in FIG. 2, whereby the contact member engages the peripheral surface 70 of pulley 66 and stops the rotation of the funnel.

Referring now to FIG. 8, the control of the operation of the apparatus will now be described with respect to said figure. The spinning motor 14 is a D.C. shunt motor and the previously mentioned rheostat 174 is connected to the armature of the motor for controlling the speed of the motor. D.C. current is supplied to the motor through the rectifier 190. The tumbling motor 16 is an A.C. capacitor motor whose capacitance is indicated at 192 and its windings at 194 and 196, respectively. A rectifier 198 is provided to supply direct current to the windings of the motor 16 to cause a braking torque to be applied to the motor as will be more clearly understood hereinafter.

Timer 170 for controlling the tumbling or intermixing period of the liquids is preferably an HP-2 timer manufactured by the Eagle Signal Company of Moline, Illinois and timer 172 for controlling the centrifuging period is preferably an HP-4 timer, also manufactured by the Eagle Signal Company. The power lines for supplying alternating current to the control circuit are indicated at L1 and L2. Normally closed stop button 200 is provided to stop the tumbling action and normally closed stop button 202 is provided to stop the spinning operation and it will be understood that these buttons may be actuated to stop the respective intermixing or centrifuging action at any time desired. In series with button 202 is a normally deenergized relay 204 which has a normally open contact *a*. A normally de-energized relay 206 is provided with normally open contracts *b*, *c*, and *d* and a normally de-energized relay 208 is provided with normally open contacts *e*, *f* and *g* and normally closed contacts *h*, *i* and *j*. The previously mentioned microswitch 144 has a movable contact 210, operatively connected to operating arm 142 of the switch, a normally open contact *k* and a normally closed contact *l*. A thermal-delay relay is shown at 216 and has a normally open contact *n* because the thermal resistance 218 of the relay is normally energized through the closed contact *i* of relay 208 so that movable contact 220 of the relay, which is operated by resistance 218, is disengaged from contact *n*. The normally open start button for operating the apparatus is indicated at 222.

FIG. 8 shows the control circuit for the apparatus in its normal de-energized condition wherein no tumbling or centrifuging action is occurring and the separatory funnel 12 is in its normal vertical position so that operating arm 140 is not engaging the operating arm 142 of the microswitch 144 and in this position contact *k* of the microswitch is open and contact *l* of the microswitch is closed, as shown. Operation of the apparatus is commenced by temporarily closing start button 222 which energizes the clutch coil 224 of timer 170 causing closing of contacts *o* and *p* of the timer. This energizes relay 206 via line L2, leads 226 and 228, normally closed contact *q* of the timer, closed contact *p*, leads 230, 232 and 234, the relay 206, and line L1 via lead 236. Closing of contact *o* of the timer provides a stick circuit for the motor 238 of the timer and the clutch coil 224 through line L2, leads 226 and 240, closed contact *o*, lead 242, motor 238, and line L1, via lead 244, in the case of the motor, and in the case of the clutch coil 224, through normally closed contact *r* of the timer, lead 246, the clutch coil, and line L1, via lead 244. Energization of motor 238 commences the timing of the intermixing period.

The closing of contact *c* of relay 206 completes an energization circuit to relay 208 through line L2, lead 248, closed contact *c*, lead 250, relay 208, and line L1, vial lead 252. Energization of relay 208 closes contact *g* of the relay and energizes the tumbling motor 16 through line L2, lead 254, closed contact *g*, and lead 256. Current flows from the motor through leads 258 and 260, which are connected together at 262, and from connection 262 through lead 264, closed contact *f*, to line L1, via lead 266. Thus it is seen that with the closing of the start button 222, the tumbling motor is energized simultaneously with the energization of the timing motor 238.

Closing of contact *g* of relay 208 opens contact *i* of said relay and thereby disconnects resistance 218 of the thermal-relay 216 from the line L2 so that contact *n* closes. However, a circuit is not completed to the rectifier 198 because contact *i* is open.

In the position shown, the centrifuging timer 172 is in its timed out condition wherein contacts *s* and *t* of the timer are open. Closing of contact *e* of relay 208, because of the energization of said relay, actuates the timer 172 into its reset condition wherein contacts *s* and *t* are closed and the normally closed contact *u* is open. The resetting circuit for timer 172 is through line L2, lead 254, closed contact *e* of relay 208, lead 268, clutch coil 270 of the timer, and line L1, via leads 272 and 273, respectively. Energization of coil 270 opens the normally closed contact *u* so that no current flows to the rectifier 190 and the spin motor 14 is not operated. Opening of contact *e* of relay 208 de-energizes coil 270 and closes contact *u* to complete a circuit to the rectifier 190 for commencing the operation of the motor 14. However, the timing motor 274 of timer 172 is energized when the timer is in its reset position through the now closed contact *s* of the timer.

Closing of contact *d* of relay 206 energizes relay 204 via line L2, lead 248, closed contact *d*, leads 275 and 276, respectively, and line L1, via lead 273. Energization of relay 204 closes contact *a* of said relay and completes an energization circuit for motor 14 up to open contact *u* of timer 172 through line L2, lead 277, closed contact *a*, lead 279 and closed contact *t* of the timer 172.

At the end of the intermixing period, the pointer of timer 170 has been moved by motor 238 to a position corresponding to the end of the period and the pointer actuates a tripping arm (not shown) of the timer which opens contacts *r* and *q* and thereby opens the circuit to motor 238 and the clutch coil 224. De-energization of the clutch coil opens contacts *o* and *p* so that relay 206 is no longer energized through the timer. De-energization of the coil 224 disengages a reset spring which returns the pointer of the timer to its reset position.

At the conclusion of the intermixing timing period, the separatory funnel 12 may be in any position of its rotation and the circuit is arranged so that tumbling motor 16 is shut off and braked only when actuating arm 140 engages the actuating arm 142 of the microswitch 144 and in this position the tumbling motor is de-energized and braked so that the separatory funnel continues to rotate and stops in its vertical position which is the correct position for the centrifuging operation. More particularly, assume that the tumbling period ends at a time when the actuating arm 142 of the microswitch is not engaged by the operating arm 140. In this condition, contact *l* of the microswitch is closed and relay 206 remains energized through line L2, lead 278, closed contact *l*, lead 280, closed contact *b* of relay 206, lead 234, relay 206, lead 236 and line L1. Relay 208 remains energized through closed contact *c* of relay 206 and the energization circuit to the tumbling motor 16 remains closed through closed contact *g* of relay 208. The tumbling motor continues to operate and rotates actuating arm 140 into position where it engages the actuating arm 142 of the microswitch and opens contact *l* and closes contact *k* which de-energizes relay 206 but relay 208 remains energized through line L2, lead 278, closed contact *k*, leads 281 and 250, respectively, relay 208, lead 252 and line L1. Tumbling motor 16 continues to rotate and actuating arm 140 releases arm 142 of the microswitch so that contact 210 is moved and opens contact *k* and closes contact *l*. Closing of contact *l* does not energize relay 206 because contact *b* of said relay has been previously opened. Opening of contact *k* de-energizes relay 208 and opens the energization circuit to the tumbling motor since contact g of relay 208 opens. This completes a braking circuit to the tumbling motor through line L2, lead 254, the now closed contact i of relay 208, closed contact n of the thermorelay 216, and the rectifier 198 and from the plus side of the rectifier through lead 282, closed contact j of relay 208, lead 284, to one end of winding 194 of the motor, bypassing capacitance 192, and from the opposite end of the other winding 196 of the motor through leads 260 and 264, respectively, through closed contact h, lead 284 to the negative side of the rectifier 198 and from the rectifier through fuse 236 to line L1 via lead 273. Also, a circuit is completed through resistance 218 through closed contact i of relay 208 and upon heating of this resistance, movable contact 220 moves and opens contact n which opens the circuit to the rectifier and ends the braking action. At this time the separatory funnel is in a vertical position for the centrifuging operation.

Opening of contact e initiates the operation of the timer 172 which controls the period of centrifuging. The clutch coil 270 of timer 172 is de-energized because of the opening of contact e so that contact u of the timer closes which completes an energization circuit to the rectifier 190 since it will be recalled that in the reset position of timer 172 contacts s and t are closed. The energization circuit for the rectifier 190 can be traced as follows: line L2, lead 277, closed contact a of relay 204, lead 279, closed contacts t and u of timer 172, lead 294, to the rectifier 190, and from the rectifier to line L1 via leads 296 and 273, respectively. Thus it is seen that the commencement of the timing period for the centrifuging operation and the operation of motor 14 occur simultaneously.

At the conclusion of the timing period for the centrifuging operation, the pointer of timer 172 trips a tripping arm which opens contacts s and t of the timer thereby opening the energization circuit to the rectifier 190 and motor 14 stops to end the centrifuging operation. Opening of contact s de-energizes the timing motor 274 and the timer 172 is now in its timed-out condition. Relay 204 still remains energized through its holding circuit provided by closed contact a of said relay. Operation of spin stop button 202 opens said holding circuit if desired but it is not necessary to de-energize relay 204 between operations of the apparatus.

From the above it will be apparent that if the intermixing period ends when arm 140 engages arm 142 of the microswitch, then contact k of the microswitch is closed so that relay 208 remains energized and the tumbling motor continues to operate. Relay 206 is de-energized because contact p of the timer 170 is open and contact 1 of the microswitch is also open. When arm 140 moves past arm 142 and releases it, contact k opens and relay 208 is de-energized and rotation of the tumbling motor is stopped, as previously described.

Figure 10:
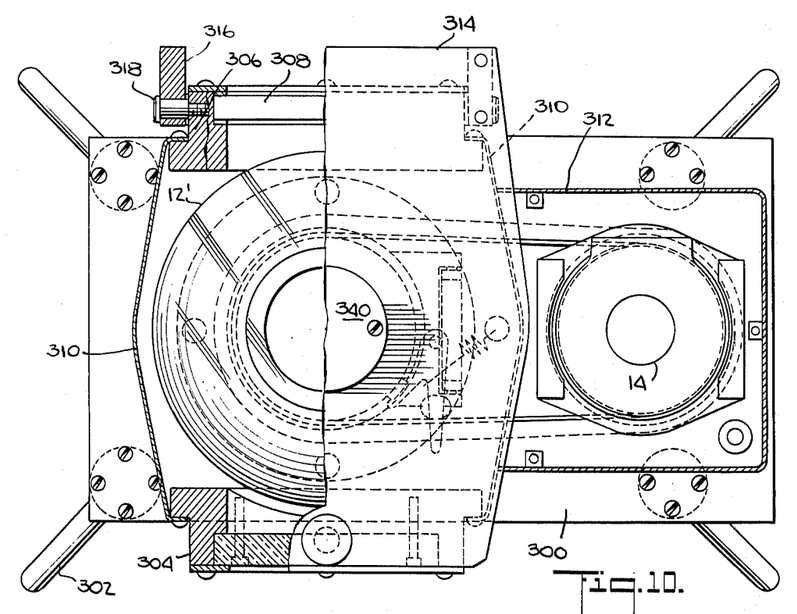
FIG. 10 is a top plan view, partly in section and with portions omitted, of the apparatus shown in FIG. 9.
Figure 11:
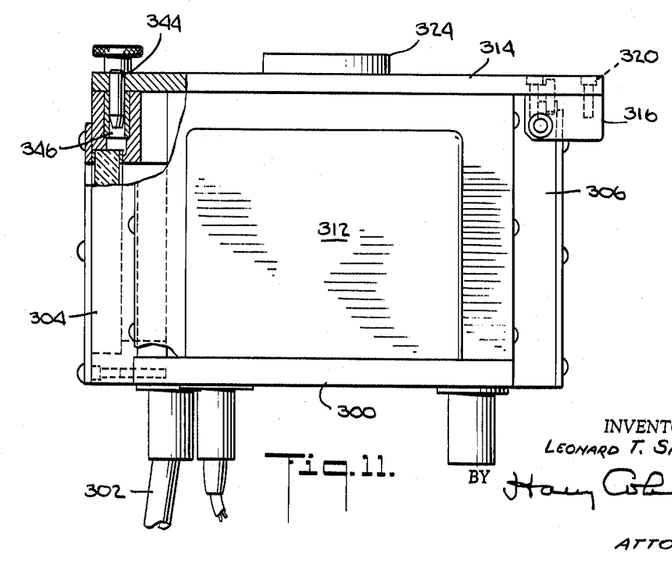
FIG. 11 is a right end elevational view, with portions cut-away, of the apparatus shown in FIG. 9.

Referring now to FIGS. 9, 10 and 11, there is shown another and preferred embodiment of the invention wherein provision for intermixing of the liquids in the apparatus prior to the centrifuging operation has been eliminated thereby providing a considerably less complicated separatory funnel. As is well understood by those skilled in the art, the intermixing of the liquid prior to centrifuging equilibrates the various liquids of the mixture with respect to each other and the intermixing period will vary depending upon the constituent liquids in the mixture. In the apparatus about to be described, the intermixing is accomplished by any suitable means prior to the mounting of the separatory funnel 12 in the apparatus for the centrifuging operation.

As will be observed, the apparatus 10′ is similar to the previously described apparatus 10 and differs in the main from the latter due to the omission of the tumbling motor, timing mechanism, and associated equipment. The separatory funnel 12′ is similar to the previously described funnel 12 but is provided with a wider inlet opening 40′ which permits the baffles 60′ to be inserted into the funnel through its inlet opening. The separatory funnel and the spinning motor 14 are mounted on a horizontal support plate 300 which is supported on legs 302. A housing block 304 is secured to the front part of plate 300 and in confronting spaced relation with said block, at the rear of the support plate, is another housing block 306. Each block is provided with a transparent window 308 so that the funnel may be observed from either the front or rear of the apparatus. The sides between the spaced blocks are enclosed by relatively thin walls 310 to provide an enclosed space in which the separatory funnel 12′ is mounted in a similar manner as previously described. The spin motor 14 is also enclosed in a relatively thin-wall housing 312 which is secured to the support plate 300. Otherwise, the spin motor is mounted in the apparatus in the same manner as previously described.

The lower support for the separatory funnel is identical to the one previously described but the upper support for the funnel has been modified. More particularly, the upper support comprises the cover 314 which is pivoted to rear block 306 by blocks 316 which pivot on pins 318 that extend from the rear block 306. The cover is secured to blocks 316 by screws 320. Secured to the cover by screws 322 is a sleeve 324 which carries vertically spaced upper and lower bearings 326 and 328, respectively, spaced from each other by spacer 330. The inner races of the bearings are press fitted to a stub shaft 332 whose lower end is provided with a disk-like member 334 that engages a plug-like member 336 which resiliently engages a plug 338 inserted in the inlet opening of the funnel. The outer races of the bearings 326 and 328 are press fitted to the sleeve 324 and the opening above the upper end of the shaft 332 is covered by a plate 340 which is screwed to the sleeve by screws 342. When the cover 314 is lifted and rotated into its open position, the entire closure assembly for the inlet opening of the funnel, including plug 338 and member 336, is removed with the cover since they are secured to the cover. The forward part of the cover is provided with an aligning pin 344 and an aligning hole 346 is provided in the front block 304 for receiving said pin to insure accurate positioning of the closure assembly of the funnel with respect to the inlet opening of the funnel.

During the rotation of the separatory funnel through the previously described drive provided at the lower mount of the funnel, all parts of the closure assembly of the funnel rotate with the funnel except the stationary sleeve 324 and the outer races of the bearings which are press fitted to the sleeve. The timing of the centrifuging operation is relatively simple and can be easily accomplished with any convenient timer, if automatic timing is desired.

While I have shown and described the preferred embodiments of my invention, it will be understood that the invention may be embodied otherwise than as herein specifically illustrated or described, and that certain changes in the form and arrangement of parts and in the specific manner of practicing the invention may be made without departing from the underlying idea or principles of this invention within the scope of the appended claims.

Having thus described my invention, what I claim and desire to secure by Letters Patent is:

1. Apparatus for separating immiscible liquids of different specific gravities from each other, comprising:

a closed container having an upper inlet for introducing the liquids into said container and means for closing said upper inlet, and a lower outlet including a valve for decanting the liquids separately from said container;

first rotating means for rotating said container about a horizontal axis; and second rotating means for rotating said container about a central vertical axis through said container.

2. Apparatus for separating immiscible liquids of different specific gravities from each other, comprising:

a closed container having upper inlet means for introducing the liquids into said container and a lower outlet including a valve for decanting the liquids separately from said container;

rotating means for rotating said container about a vertical axis through said container; and said closed container having a lower portion, and an upper portion which is continuous with said lower portion and which upper portion has a larger horizontal cross-sectional area and a larger volume than the horizontal cross-sectional area and the volume of said lower portion.

3. Apparatus for separating immiscible liquids of different specific gravities from each other, comprising:

a closed container having an upper inlet means for introducing the liquids into said container and a lower outlet including a valve for decanting the liquids separately from said container;

rotating means for rotating said container about a vertical axis through said container; and said closed container having a lower portion, and an upper portion which is continuous with said lower portion and which upper portion has a greater horizontal dimension than the horizontal dimension of said lower portion and a greater vertical dimension than the vertical dimension of said lower portion.

4. Apparatus for separating immiscible liquids of different specific gravities from each other, comprising:

a closed container having an upper inlet means for introducing the liquids into said container and a lower outlet including a valve for decanting the liquids separately from said container;

rotating means for rotating said container about a vertical axis through said container; and said closed container having a lower portion, and an upper portion, which portions are symmetrical with respect to said vertical axis, said upper portion being continuous with said lower portion and having a greater horizontal radius than the horizontal radius of said lower portion.

5. Apparatus for separating two immiscible liquids of different specific gravities from each other, comprising:

a closed container, which is symmetrical about a vertical axis, having liquid enclosing and retaining side and bottom walls, a lowermost outlet including a valve for decanting liquids from said container, a first portion above said valve having a small horizontal inner radius, a second portion above and continuous with said first portion and having an inner horizontal radius which is relatively larger than that of said lower portion; and means for supporting said container vertically and for rotating said container about said vertical axis.

6. Apparatus for separating two immiscible liquids of different specific gravities from each other, comprising;

a closed container, which is symmetrical about a vertical axis, having liquid enclosing and retaining side and bottom walls, a lowermost outlet including valve for decanting liquids from said container, a first portion above said valve having a small horizontal inner radius, a second portion above and continuous with said first portion and having an inner horizontal radius which is relatively larger than that of said lower portion; and motive means fixed to said container above said outlet valve for supporting said container vertically and for rotating said container about said vertical axis, whereby said outlet valve may be operated to decant the liquids when said container is stationary and said motive means is fixed to said container.

7. Apparatus for separating two immiscible liquids of different specific gravities from each other, comprising:

a closed container, which is symmetrical about a vertical axis, having liquid enclosing and retaining side, top and bottom walls, a lowermost outlet including a valve for decanting liquids from said container, a first portion above said valve having a small inner radius, a second portion continuous with and above said first portion and having an inner horizontal radius, which is relatively larger than that of said lower portion, and an inlet for introducing liquids into said container and means for closing said inlet;

first motive means fixed to said container above said outlet valve for supporting said container vertically and for rotating said container about said vertical axis;

second motive means coupled to said first motive means for rotating said container about a horizontal axis; and whereby when said container is vertical and stationary said inlet means may be operated to introduce the liquids and said outlet valve may be operated to decant the liquids.

References Cited by the Examiner

UNITED STATES PATENTS

| | | | |
|---|---|---|---|
| 520,131 | 5/1894 | Andersson | 233—3 |
| 1,242,560 | 10/1917 | Kingsbury | 233—46 X |
| 2,171,499 | 8/1939 | Busi | 68—25 |
| 2,261,936 | 11/1941 | Johnson. | |
| 2,283,612 | 5/1942 | Perry | 68—25 |
| 2,559,708 | 7/1951 | Calhoun | 68—25 |
| 2,579,310 | 12/1951 | Dunham | 68—25 |
| 2,928,591 | 3/1960 | Deaver | 233—26 |

FOREIGN PATENTS

| | | |
|---|---|---|
| 576,395 | 5/1959 | Canada. |
| 751,088 | 6/1956 | Great Britain. |

OTHER REFERENCES

Modern Laboratory Appliances Catalog 59, Fisher Scientific Company, copyright 1958, pages 182, 187 and 197.

M. CARY NELSON, *Primary Examiner.*

HESTER L. MARTIN, RONALD R. WEAVER, HARRY B. THORNTON, *Examiners.*